United States Patent [19]

Sakamoto et al.

[11] Patent Number: 4,898,463
[45] Date of Patent: Feb. 6, 1990

[54] OPTICAL TIME DOMAIN REFLECTOMETER WITH AUTOMATIC MEASURING FUNCTION OF OPTICAL FIBER DEFECTS

[75] Inventors: Takashi Sakamoto; Kazumaro Kitagawa, both of Atsugi, Japan

[73] Assignee: Anritsu Corporation, Tokyo, Japan

[21] Appl. No.: 276,231

[22] Filed: Nov. 23, 1988

[30] Foreign Application Priority Data

Nov. 27, 1987 [JP] Japan ................. 62-297803

[51] Int. Cl.$^4$ .............................. G01N 21/88
[52] U.S. Cl. ................................. 356/73.1
[58] Field of Search ......................... 356/73.1

[56] References Cited

U.S. PATENT DOCUMENTS

| | | | |
|---|---|---|---|
| 4,527,113 | 7/1985 | Hillerich | 324/52 |
| 4,606,632 | 8/1986 | Hillerich | 356/73.1 |
| 4,732,469 | 3/1988 | Souma | 356/73.1 |

Primary Examiner—Vincent P. McGraw
Attorney, Agent, or Firm—Frishauf, Holtz, Goodman & Woodward

[57] ABSTRACT

A light source supplies an optical pulse to a target optical fiber. A light receiver produces an electric signal corresponding to reflection light from the target optical fiber. A processor performs digital processing on the electric signal to thereby produce waveform data. A level computing section computes level difference data for a predetermined unit interval of the waveform data. A comparator compares the level difference data with a first threshold value and produces reference position data indicating a position where the level difference data exceeds the first threshold value. A detector retrieves that level difference data which is located within a predetermined range preceding and succeeding the reference position data, to thereby detect first and second position data indicating preceding and succeeding constant-value start points, and detect first level data included in the waveform data, which corresponds to a point attained by adding the predetermined unit interval to the first position data, and second level data of the waveform data which corresponds to the second position data. A judging section acquires difference data indicating a difference in level between the first and second level data and determines a defective point in the target optical fiber by comparing the difference data with a second threshold value.

15 Claims, 6 Drawing Sheets

OPTICAL TIME DOMAIN REFLECTOMETER WITH AUTOMATIC MEASURING FUNCTION OF OPTICAL FIBER DEFECTS

BACKGROUND OF THE INVENTION

1. Field of the Invention

The present invention relates to an optical time domain reflectometer and, more particularly, to an optical time domain reflectometer which detects backscattered light and Fresnel reflection light, generated by an optical pulse sent to a target optical fiber and returning from the fiber, to thereby automatically measure defect locations of the target optical fiber, such as the optical loss and damaged sections of the fiber in question.

2. Description of the Related Art

Optical time domain reflectometers are known apparatuses which detect backscattered light and Fresnel reflection light generated by an optical pulse sent to a target optical fiber and returning from the fiber, and perform a predetermined calculation with the detection signal in order to measure the optical loss and damaged sections of the target optical fiber.

Figure 1:
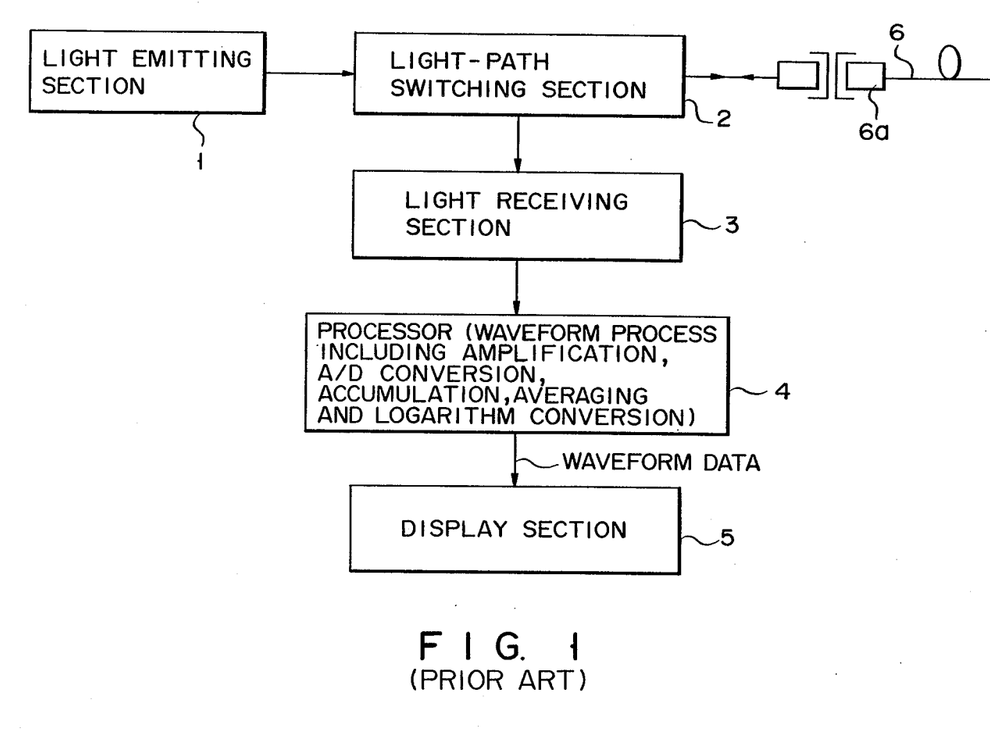
FIG. 1 is a block diagram schematically illustrating a conventional optical time domain reflectometer.

FIG. 1 is a block diagram schematically illustrating the arrangement of this type of conventional optical time domain reflectometer.

The optical time domain reflectometer illustrated by this Figure comprises a light emitting section 1, a light-path switching section 2, a light receiving section 3, a processor 4, and a display section 5. Light emitting section 1 supplies an optical pulse to a target optical fiber 6. This pulse generates backscattered light and Fresnel reflection light in the target optical fiber, which are reflected from the fiber, and are branched by light-path switching section 2 and detected by light receiving section 3. The detection signal from section 3 is sent to processor 4 where it is subjected to a predetermined signal processing. More specifically, processor 4 amplifies the level of the received detection signal and performs the sampling of the signal at a given sampling period for later A/D conversion thereof. Subsequently, processor 4 accumulates the data for each sampling point, executes a predetermined waveform processing which includes averaging and logarithm conversion, and displays the result of the signal processing on the screen of display section 5.

When using the above optical time domain reflectometer, it is normal practice to manually measure defective or damaged sections which may be found at the spliced section of target fiber 6; such damaged sections would result in undesirable deterioration of the characteristic. First, the operator observes the trace of the backscattered light and Fresnel reflection light displayed on the screen of display section 5, and then operates appropriate switches, keys, etc. provided on the front section of the operation panel of the reflectometer to move a marker on the screen to an assumed defective point. If the difference in level between markers is equal to or greater than a specified loss, the operator aligns a cursor line with the marker position on the assumed defective point on the screen and reads the displayed distance as distance data to the defective point.

According to this conventional optical time domain reflectometer, however, when one desires to find only that defective point which shows a loss equal to or greater than a predetermined level, the work required to do so results in an increase in the number of steps the operator must perform, thus necessitating a greater length of time to obtain the desired measurement. In addition, the measured values are likely to vary depending on the skill and experience of the operator conducting the operation, in which case, it may not always be possible to obtain accurate measurements.

SUMMARY OF THE INVENTION

It is, therefore, an object of this invention to provide a new and improved optical time domain reflectometer having an automatic measuring function of optical fiber defects, which significantly simplifies the manual operation and reduces the measuring time while, at the same time, always ensuring various types of stable, accurate measurements.

According to one aspect of this invention, there is provided an optical time domain reflectometer comprising:

light emitting means for supplying an optical pulse to a target optical fiber;

light receiving means for producing an electric signal corresponding to reflection light from the target optical fiber;

processing means for performing digital processing on the electric signal from the light receiving means, to thereby produce waveform data;

level computing means for computing level difference data for a predetermined unit interval of the waveform data from the processing means;

comparing means for comparing the level difference data computed by the level computing means with a first threshold value and producing reference position data indicating a position where the level difference data exceeds the first threshold value;

detecting means for retrieving that level difference data from the level computing means which is located within a predetermined range preceding and succeeding the reference position data from the comparing means, to thereby detect first and second position data indicating preceding and succeeding constant-value start points, and detect first level data included in the waveform data from the processing means, which corresponds to a point attained by adding the predetermined unit interval to the first position data, and second level data of the waveform data which corresponds to the second position data; and judging means for acquiring difference data indicating a difference in level between the first and second level data detected by the detecting means and determining a defective point in the target optical fiber by comparing the difference data with a second threshold value.

BRIEF DESCRIPTION OF THE DRAWINGS

The object as well as other objects and features of this invention can be understood through the following description of a preferred embodiment with reference to the accompanying drawings, of which.

DETAILED DESCRIPTION OF THE PREFERRED EMBODIMENT

Figure 2:
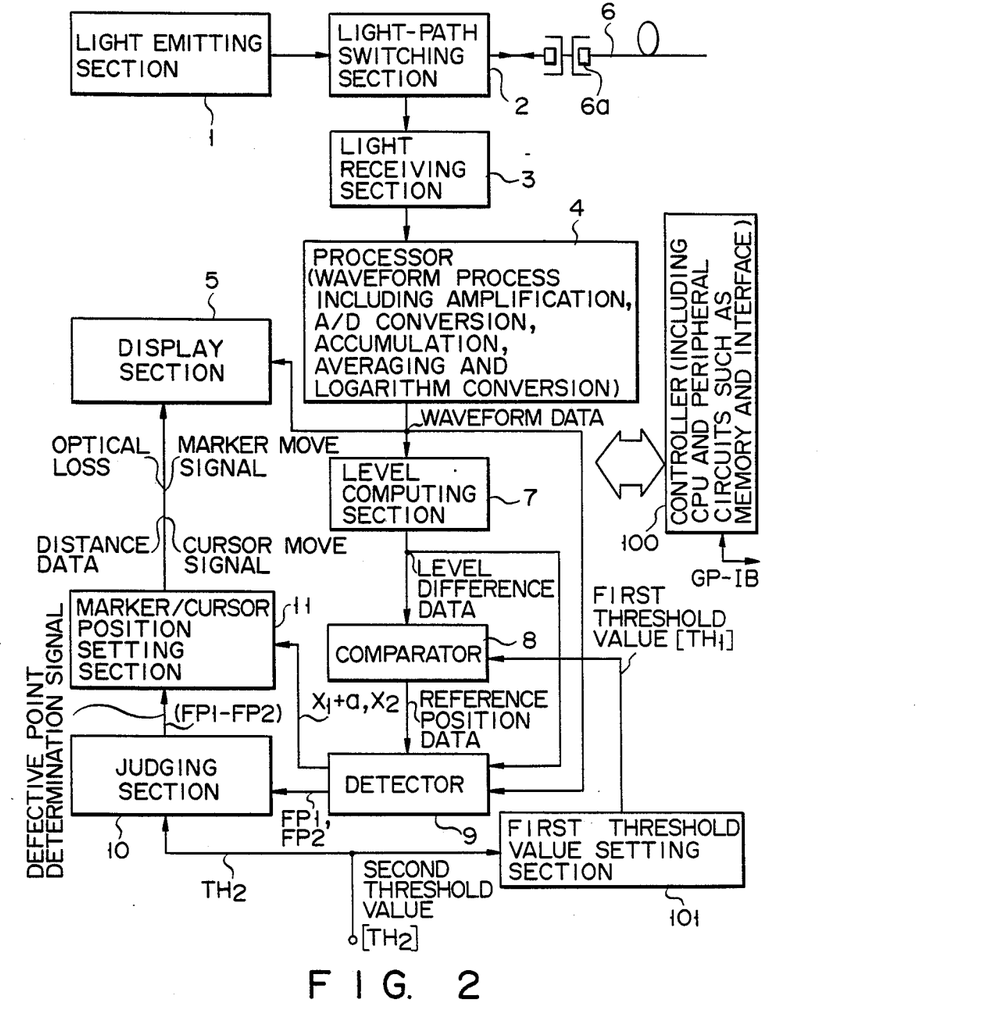
FIG. 2 is a block diagram illustrating an optical time domain reflectometer according to one embodiment of this invention.

FIG. 2 is a block diagram illustrating an optical time domain reflectometer according to one embodiment of this invention.

In describing this embodiment, the same reference numerals as used to denote the components of the conventional optical time domain reflectometer shown in FIG. 1 are also used to specify the same or identical elements, and their description will be omitted.

The optical time domain reflectometer according to this embodiment comprises a light emitting section 1, light-path switching section 2, a light receiving section 3, a processor 4, a display section 5, a level computing section 7, a comparator 8, a detector 9, a judging section 10, a marker/cursor position setting section 11 and a controller 100. The following is a brief description of the present apparatus. As described earlier, in the first half stage up to and including processor 4, backscattered light and Fresnel reflection light are generated in a target optical fiber 6 by an optical pulse supplied thereto from light emitting section 1, these lights are subjected to signal processing and the result of the signal processing is displayed as waveform data on a screen 5a (see FIG. 4A). At the same time, in the second half stage (novel part) after and including level computing section 7, a predetermined calculation is performed on waveform data originated from the backscattered light and Fresnel reflection light corresponding to the displayed waveform data to automatically detect and measure the optical loss at a position which is judged to be a defective point in target optical fiber 6 and the distance to this judged defective point from the light-entering end of the fiber 6, and the results are displayed on, for example, display screen 5a.

This will be described below more specifically. In the first half stage, when an optical pulse is supplied to target optical fiber 6, the backscattered light and Fresnel reflection light are generated in the fiber 6 and are detected by light receiving section 3, and the detection signal is subjected to signal processing for each sampling point, and the result of the signal processing is displayed on display screen 5a. Level computing section 7 computes level difference data for a predetermined unit interval of the waveform data from the processor 4. Comparator 8 compares the level difference data with a first threshold value $TH_1$ and producing reference position data indicating a position where the level difference data exceeds the first threshold value $TH_1$. Detector 9 retrieve that level difference data from level computing section 7 which is located within a predetermined range preceding and succeeding the reference position data from comparator 8, to thereby detect first and second position data indicating preceding and succeeding constant-value start points, and detect first level data included in the waveform data from the processor 4, which corresponds to a point attained by adding the predetermined unit interval to the first position data, and second level data of the waveform data which corresponds to the second position data.

Judging section 10 acquires difference data indicating a difference in level between the first and second level data detected by the detecting means and determining a defective point in the target optical fiber by comparing the difference data with a second threshold value.

A description will now be given of the function of each element.

Light emitting section 1 supplies an optical pulse of a given level and a given pulse width to target optical fiber 6 through light-path switching section 2.

Light-path switching section 2 sends to light receiving section 3 the backscattered light and Fresnel reflection light generated and reflected from target optical fiber by the optical pulse.

Light receiving section 3 receives the back scattered light and Fresnel reflection light from target optical fiber 6 through light-path switching section 2. This section 3 converts the received optical pulse into an electric signal and sends the signal, as a detection signal, to processor 4.

Processor 4 executes signal processing of the detection signal from light receiving section 3. In processor 4, the detection signal is subjected to level amplification, the amplified signal is sampled at a predetermined sampling period, and the sampled signal is subjected to A/D conversion. Each A/D-converted data is accumulated for each sampling point and is then subjected to a predetermined waveform processing including averaging and logarithm conversion processes, and the resultant data is displayed, as waveform data, on display screen 5a for visual confirmation by an operator.

Level computing section 7 sequentially performs a differentiation of waveform data corresponding to the waveform data displayed on display screen 5a for each preset interval a (see FIG. 4A) to provide a predetermined number of level difference data between two points for each interval a. The interval a between two points of the data to be subjected to the differentiation is determined on the basis of the pulse width b of the Fresnel reflection light detected by the light receiving section 3 and is set slightly greater than this pulse width b (see FIG. 4A).

Comparator 8 compares each level difference data acquired by the computation performed in level computing section 7 with a first threshold value $TH_1$ (see FIG. 4B; e.g., a value lower than 0 by 3dB) that is externally set in advance. In this embodiment, reference position (Z1) data sent to detector 9 from comparator 8 is that data of the level difference data which exceeds the first threshold value $TH_1$ and is the closest to the optical pulse-entering end of target optical fiber 6. This first threshold value $TH_1$ can be externally changed in accordance with the amount of loss measured.

Detector 9 detects data Lmax and Lmin (see FIG. 4B) indicating the maximum and minimum values on a differential curve based on the reference position data supplied from comparator 8. With the positions of the data Lmax and Lmin used as reference points, detector 9 retrieves level difference data within a predetermined range preceding and succeeding the reference points and detects position data $X_1$ and $X_2$ (see FIG. 4B) at which the level becomes constant. Detector 9 also detects level data FP1 and FP2 (FIG. 4A) on the waveform data before the differentiation which correspond to position data $X_1+a$ and $X_2$.

Judging section 10 computes the level difference, FP1–FP2, between the level data detected by detector 9, and compares difference data representing this level difference with a second threshold value $TH_2$ (to be described later) and determines that the difference data indicates an actual defective point if it exceeds second threshold value $TH_2$.

Marker/cursor position setting section 11 moves two markers 12 (see FIG. 4A) on display screen 5a in accordance with a defective point determination signal supplied from judging section 10 and moves a cursor 13 (FIG. 4A) to a given position in synchronism with the movement of the markers 12. Upon reception of the defective point determination signal from judging section 10, indicating that the difference data has exceeded the second threshold value $TH_2$, marker/cursor position setting section 11 sends a marker move signal to display section 5 in order to move two markers 12 on display screen 5a to the respective positions, $X_1+a$ and $X_2$, corresponding to level data FP1 and FP2 detected by detector 9, and then sends a cursor move signal to display section 5 to move cursor 13 to the position of the left marker 12. Marker/cursor position setting section 11 further sends an output signal to display section 5 to display an optical loss value 5c at the defective point and distance data 5b on display screen 5a.

Controller 100, which controls the operations of the individual components described above, includes a CPU and peripheral circuits, such as a memory and an interface; in practice, the CPU may serve to perform the functions of the aforementioned individual components.

Figure 3:
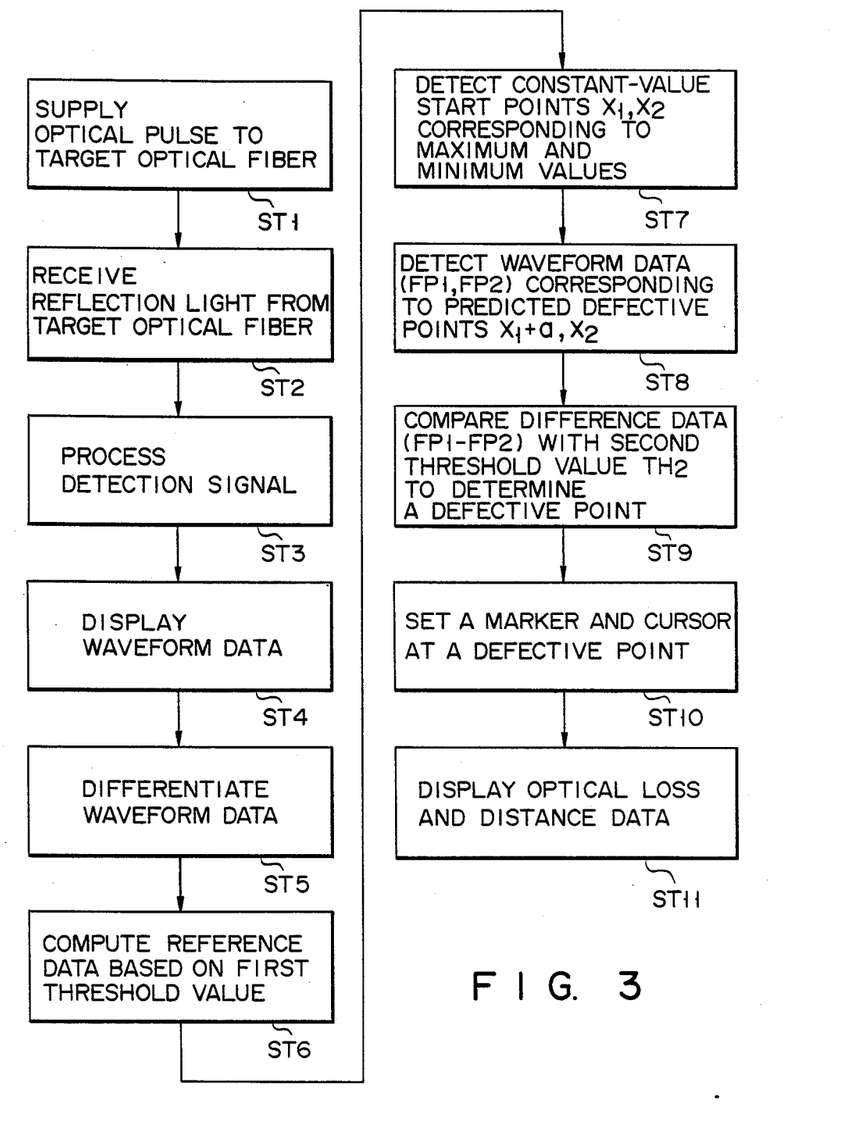
FIG. 3 is a flowchart illustrating a general signal processing executed by the optical time domain reflectometer according to this embodiment.
Figure 4A:
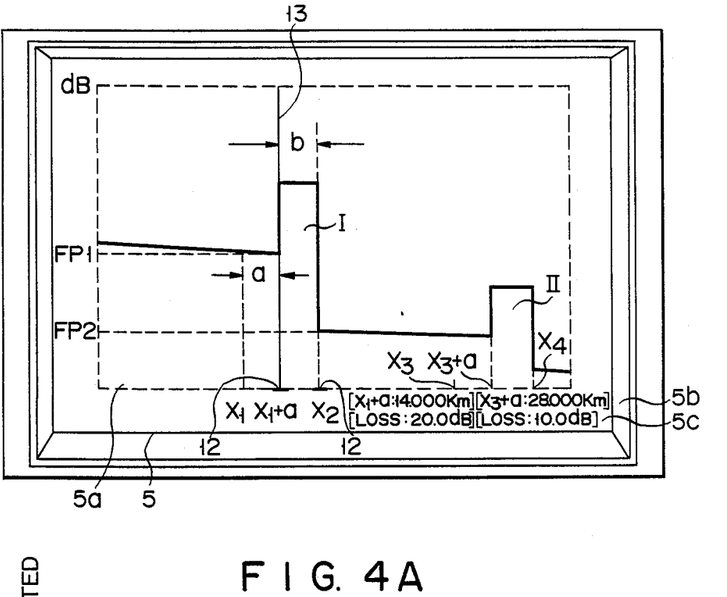
FIG. 4A is a diagram illustrating waveform data displayed on a display section of the optical time domain reflectometer according to this embodiment.

Referring to the flowchart of FIG. 3, a description will now be given of the operation of thus constituted optical time domain reflectometer in the case where waveform data as shown in FIG. 4A is displayed on display section 5.

Figure 4B:
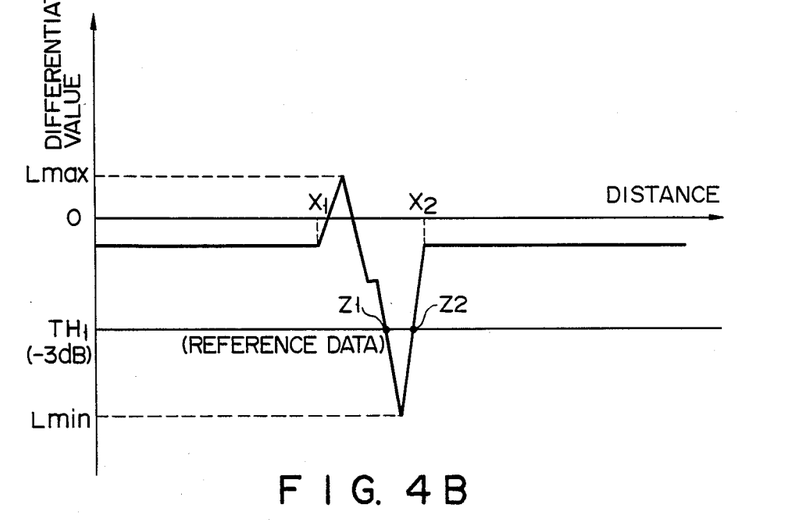
FIG. 4B is a diagram illustrating data acquired by performing a differentiation of the waveform data shown in FIG. 4A.

When an optical pulse is supplied to target optical fiber 6 (step ST1 in FIG. 3), backscattered light and Fresnel reflection light are reflected from target optical fiber 6 and are received by light receiving section 3 (step ST2). The optical pulse representing the received reflection lights is subjected to a given signal processing (step ST3) in processor 4 before being subjected to waveform processing, and the trace of the waveform data as shown in FIG. 4A resulting from the waveform processing is displayed on display screen 5a of display section 5 (step ST4). Then, level computing section 7 sequentially performs a differentiation of waveform data corresponding to the waveform data displayed on display screen 5a to compute level difference data between two points (step ST5). The computation results are illustrated in FIG. 4B; it should be noted that the level difference is constant in a range where the inclination in the trace of the waveform data shown in FIG. 4A, which indicates the backscattered light component, but there is a level difference apparent in a range which indicates the Fresnel reflection light component. Subsequently, comparator 8 compares each level difference data acquired by level computing section 7 with the preset first threshold value $TH_1$ and selectively outputs reference position (Z1) data that indicates the position where the former exceeds the latter (step ST6). This reference position (Z1) data is, as indicated by the black dot in FIG. 4B, the position data corresponding to that level difference data of the level difference data exceeding the first threshold value $TH_1$ which is the closest to the input side to which the optical pulse is supplied. Detector 9 retrieves level difference data supplied from level computing section 7 within a given range preceding and succeeding the reference position data so as to detect the maximum value Lmax and minimum value Lmin. Detector 9 further retrieves level difference data within a given range preceding and succeeding the positions indicating the maximum data Lmax and minimum data Lmin so as to detect position data ($X_1$, $X_2$) at which the level becomes constant first or which indicates the constant-value start points (step ST7). Detector 9 then adds a predetermined unit interval a to $X_1$ and detects level data FP1 and FP2 (see FIG. 4A) of the two points on the waveform data before the level computation (differentiation), namely the waveform data from processor 4 which corresponds to the position data $X_1+a$ and $X_2$ (step ST8). Judging section 10 obtains the difference between the level data FP1 and FP2 from detector 9 and compares the difference data, FP1–FP2, with the second threshold value $TH_2$ to determine the defective point (step ST9). Accordingly, it is checked whether or not the loss level at the point which is a predicted defective point exceeds the second threshold value $TH_2$; such a point can be really considered a defective point. The first threshold value $TH_1$ is internally set by a first threshold value setting section 101 in accordance with the externally set second threshold value $TH_2$, for example, to be equal to the latter value, but the first threshold value is not limited to such a value. When the difference data exceeds the second threshold value $TH_2$, marker/cursor position setting section 11 determines this section to be a defective point and performs the following control. First, marker/cursor position setting section 11 sends the marker move signal to display section 5 to move markers 12 to positions $X_1+a$ and $X_2$ indicating the level data FP1 and FP2 on display screen 5a as shown in FIG. 4A, and it then sends the cursor move signal to display section 5 to move cursor 13 to the position $X_1+a$ of the level data FP1 on display screen 5a (step ST10). Then, marker/cursor position setting section 11 supplies to display section 5 the optical loss value 5c at the defective point and the distance data 5b indicating the distance between the light-entering end of target optical fiber 6 and the defective point to display these data on display screen 5a (step ST11).

The above operation is executed by external key operation or throwing on the power switch provided on the operation panel of the present apparatus, and the subsequent operation is automatically executed by controller 100. This eliminates the need of the conventional, troublesome operation and prevents a variation in measurement which might otherwise be caused by the difference in skills and experiences of different operators, thus always ensuring stable, highly accurate measurement and shortening the measuring time.

Since this embodiment can automatically measure the loss level of that section which has a loss equal to or greater than a specified level and the distance to this point, it is effective in measuring the defective point. For instance, even when an actual optical fiber line is rendered nonconductive due to the fiber cable being cut off or the like, the cut-off point can be detected at a short period of time, thus shortening the restoring of the line.

Figure 5:
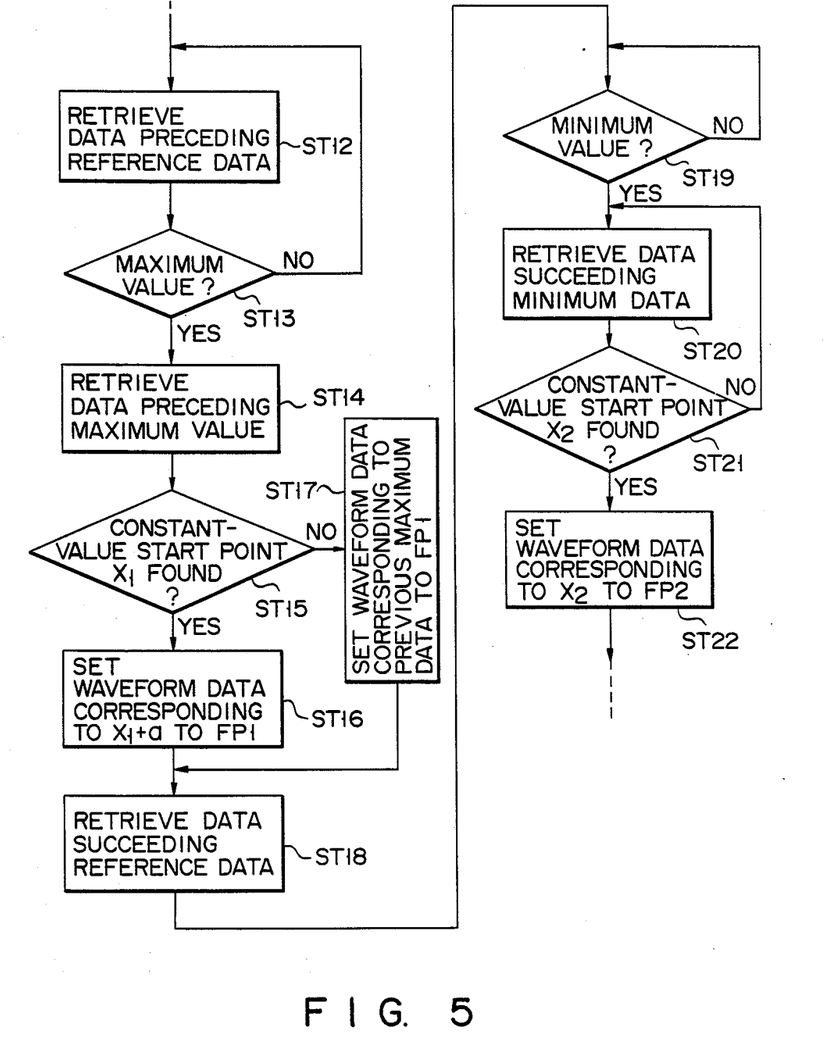
FIG. 5 is a flowchart illustrating a general signal processing executed in a detector of the optical time domain reflectometer according to this embodiment.

Referring now to the flowchart of FIG. 5, a detailed description will be given of the operational flow included in the above-described operation for detecting the level data FP1 and FP2 on the waveform data corresponding to the defective point based on reference data.

After the reference data is selected by comparator 8 in the mentioned manner, detector 9 retrieves data preceding to the reference data (step ST12) until it detects the maximum data Lmax. Upon detection of the maximum data Lmax (step ST13), detector 9 further retrieves data preceding this maximum data Lmax (step ST14) to find the point $X_1$ at which the level becomes constant. When such a point is detected (step ST15), the waveform data corresponding to point $X_1+a$ is taken as FP1 (step ST16). When $X_1$ is not detected, the waveform data corresponding to the previously detected maximum data Lmax is taken as FP1 (step ST17). Once the data FP1 has been determined, detector 9 retrieves data succeeding the reference data (step ST18). When the minimum data Lmin is detected during this retrieval (step ST19), detector 9 retrieves data succeeding this minimum data Lmin (step ST20). When the point $X_2$ at which the level following the minimum data Lmin becomes constant is detected (step ST21), the waveform data corresponding to this point $X_2$ is taken as FP2 (step ST22).

Figure 6A:
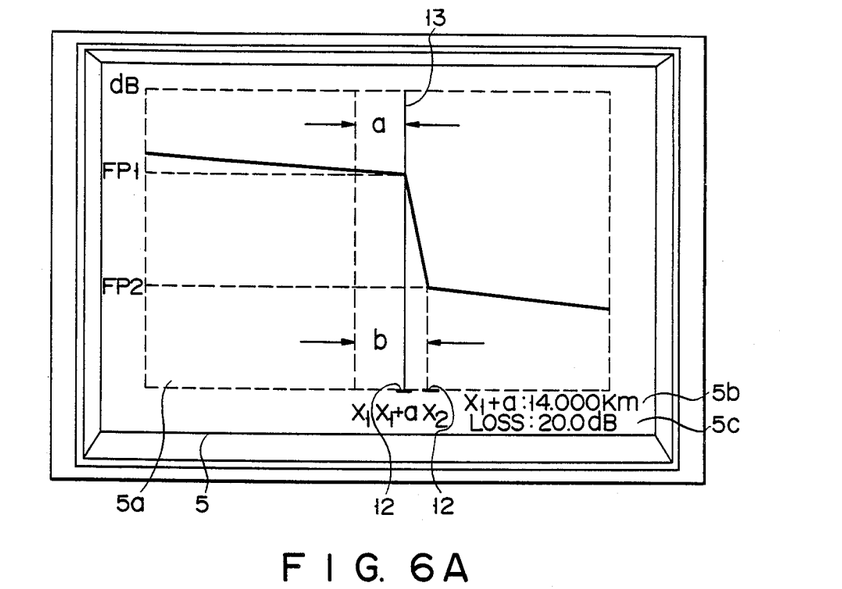
FIG. 6A is a diagram illustrating another pattern of waveform data displayed on a display section of the optical time domain reflectometer according to this embodiment.
Figure 6B:
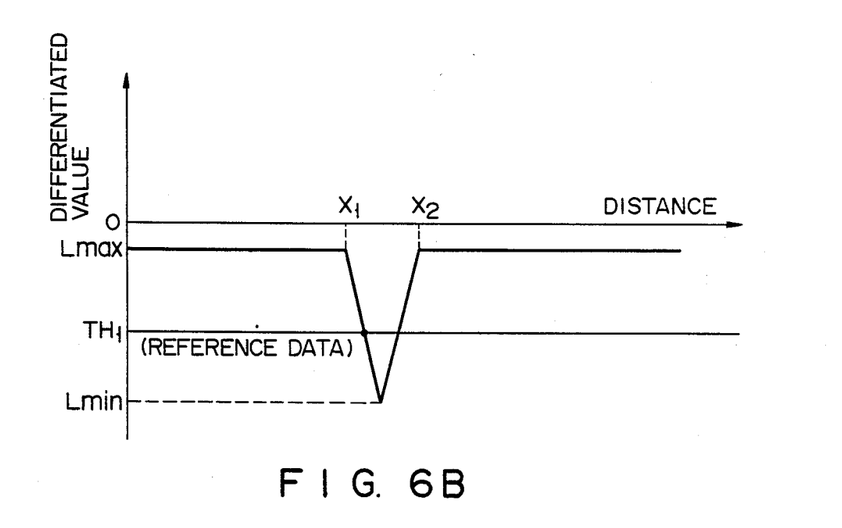
FIG. 6B is a diagram illustrating data acquired by performing a differentiation of the waveform data shown in FIG. 6A.

According to the above embodiment, the waveform data as shown in FIG. 4a is displayed on display screen 5a, and it is subjected to differentiation to compute the level difference between tow points, thereby providing the data as shown in FIG. 4B, based on which, the amount of the optical loss at the defective point and the distance to the defective point are detected. This invention is in no way restricted to this particular case; for instance, waveform data having the pattern shown in FIG. 6A may be displayed on display screen 5a. In this case, like in the above embodiment, data such as FP1 and FP2 are detected to find the defective point, the positions of markers 12 and cursor 13 are set in accordance with the data, and the optical loss value (level difference) 5c at the detected defective point and the distance data 5b indicating the distance to the defective point are displayed on display screen 5a.

Although data at the proximity of the positive and negative peaks of the aforementioned waveform data may have different inclinations due to a difference in loss of the fiber, such a variation does not substantially influence the effect of this invention.

As shown in FIG. 4B, although the above description has been given with reference to the case where the reference data from comparator 8 is equal to the threshold value $TH_1$ for a cross point $Z_1$ closest to the input side to which an optical pulse is supplied, the reference data may be the threshold value $TH_1$ for another cross point $Z_2$ furthest to the input side.

Further, instead of directly displaying the detected data of the defective point on display section 5, such data may be sent to an external unit through an interface line (GP-IB) coupled to controller 100.

According to the present optical time domain reflectometer, as described above, the defective point such as a spliced point having an optical loss equal to or greater than a specified level is automatically detected and the optical loss at this defective point and the distance to the point are displayed on the display screen. This significantly reduces the manual operation by an operator and makes the overall operation very simple, so that the measurement does not depend on the skill and experience of the operator, thus always ensuring stable and accurate measurement.

The present apparatus is particularly effective in detecting only those defective points which show an optical loss equal to or greater than a predetermined level.

This invention is not restricted to the above embodiment according to which only one defective point is detected; it may be modified to sequentially detect and display a plurality of defective points $X1+a$, $X3+a$, . . . , as indicated by I and II in FIG. 4A. This may be realized by controller 100 making a request to sequentially search for the second defective point, third defective point, and so forth upon detection of the first defective point.

What is claimed is:
1. An optical time domain reflectometer comprising:
light emitting means for supplying an optical pulse to a target optical fiber;
light receiving means for producing an electric signal corresponding to reflection light from said target optical fiber;
processing means for performing digital processing on said electric signal from said light receiving means, to thereby produce waveform data;
level computing means for computing level difference data for a predetermined unit interval of said waveform data from said processing means;
comparing means for comparing said level difference data computed by said level computing means with a first threshold value and producing reference position data indicating a position where said level difference data exceeds said first threshold value;
detecting means for retrieving from said comparing means that level difference data from said level computing means which is located within a predetermined range preceding and succeeding said reference position data, to thereby detect first and second position data indicating preceding and succeeding constant-value start points, and detect first level data included in said waveform data from said processing means, which corresponds to a point attained by adding said predetermined unit interval to said first position data, and second level data of said waveform data which corresponds to said second position data; and
judging means for acquiring difference data indicating a difference in level between said first and second level data detected by said detecting means and determining a defective point in said target optical fiber by comparing said difference data with a second threshold value.

2. The optical time domain reflectometer according to claim 1, further comprising display means for displaying said waveform data processed by said processing means and a defective point in said target optical fiber, in accordance with a decision made by said judging means.

3. The optical time domain reflectometer according to claim 2, wherein said defective point is displayed as distance data of a point corresponding to said first level data detected by said detecting means.

4. The optical time domain reflectometer according to claim 3, wherein said defective point is displayed in terms of said difference data acquired by said judging means taken as an optical loss value.

5. The optical time domain reflectometer according to claim 3, further comprising cursor position setting means for moving a cursor to a point corresponding to said first level data in said waveform data displayed on said display means, in accordance with said decision made by said judging means.

6. The optical time domain reflectometer according to claim 5, wherein said cursor position setting means moves a marker to said point corresponding to said first level data prior to moving said cursor.

7. The optical time domain reflectometer according to claim 1, wherein said first and second threshold values are externally set to desired values.

8. The optical time domain reflectometer according to claim 7, wherein said first and second threshold values are set equal to each other.

9. The optical time domain reflectometer according to claim 1, wherein said predetermined unit interval involved in computation executed by said level computing means is substantially equal to a width of said optical pulse supplied from said light emitting means.

10. The optical time domain reflectometer according to claim 1, further comprising control means for issuing a command to sequentially search for a plurality of defective points in said target optical fiber.

11. The optical time domain reflectometer according to claim 1, wherein said level computing means includes means for sequentially performing a differentiation on said waveform data for said predetermined unit interval.

12. The optical time domain reflectometer according to claim 1, wherein before detecting said first and second position data indicating said constant-value start points, said detecting means detects a maximum value and a minimum value and searches a given range preceding and succeeding positions indicating said maximum and minimum values.

13. An optical time domain reflectometer which sends an optical pulse through a pulse-entering point to a target optical fiber, receives light coming out from said pulse-entering point to provide a detection signal, and subjecting said detection signal to discrete signal processing for a given period, said reflectometer comprising:

a difference computing unit for computing a difference signal for a first predetermined interval of said detection signal;

a first detector, for detecting that said difference signal from said difference computing unit exceeds a first threshold value;

a second detector, for detecting first and second constant-value changing positions and by retrieving difference signals within a range of a second predetermined interval preceding and succeeding said difference signal detected to have exceeded said first threshold value by said first detector; and judging means for detecting a defective point in said target optical fiber by detecting that a difference between said detection signal at a position following said first constant-value changing position by said first predetermined interval and said detection signal at said second constant-value changing position exceeds a second threshold value.

14. The optical time domain reflectometer according to claim 13, wherein said second predetermined interval is equal or near to said first predetermined interval.

15. An optical time domain reflectometer which receives backscattered light and Fresnel reflection light reflected from a target optical fiber by supplying an optical pulse to said target optical fiber, subjects a detection signal obtained by said reception of said backscattered light and Fresnel reflection light to signal processing for each sampling point, and displays resultant waveform data on a display screen, to thereby measure an optical loss and a defective point of said target optical fiber, said reflectometer comprising:

a level computing section for computing a level difference between two points on said waveform data originating from said backscattered light and Fresnel reflection light and displayed on said display screen;

a comparator for comparing each level difference acquired by said level computing section with a preset threshold value;

a detector for retrieving data preceding and succeeding data acquired from said comparator, to detect first and second constant values and detecting data corresponding to a defective point on the basis of said first and second constant values; and a display section for displaying a measured result at said defective point on the basis of a detection result of said detector.

* * * * *

UNITED STATES PATENT AND TRADEMARK OFFICE
CERTIFICATE OF CORRECTION

PATENT NO. : 4,898,463
DATED : February 6, 1990
INVENTOR(S) : SAKAMOTO et al

It is certified that error appears in the above-identified patent and that said Letters Patent is hereby corrected as shown below:

On the title page, under "[56] References Cited", insert the following after "U.S. PATENT DOCUMENTS":

FOREIGN PATENT DOCUMENTS:

| | | |
|---|---|---|
| EP-0-063 695 | 1982 | European |
| FR-A-2 520 114 | 1983 | France |
| DE-3340426 C1 | 1985 | W. Germany |

OTHER DOCUMENTS:

Patent Abstract of Japan, Vol. 10, No.338 (P-516) (2394), Nov. 25, 1986 & JP-A-61 139 886 (Canon Inc.) 27-06-1986.

Patent Abstract of Japan, Vol. 11, No.100 (P-561) (2547), March 28, 1987; & JP-A-61 250 519 (JAPAN STEEL & TUBE CONSTR. CO., LTD. 7-11-1986.

Signed and Sealed this

Eighteenth Day of August, 1992

Attest:

DOUGLAS B. COMER

Attesting Officer

Acting Commissioner of Patents and Trademarks